Figure 1:
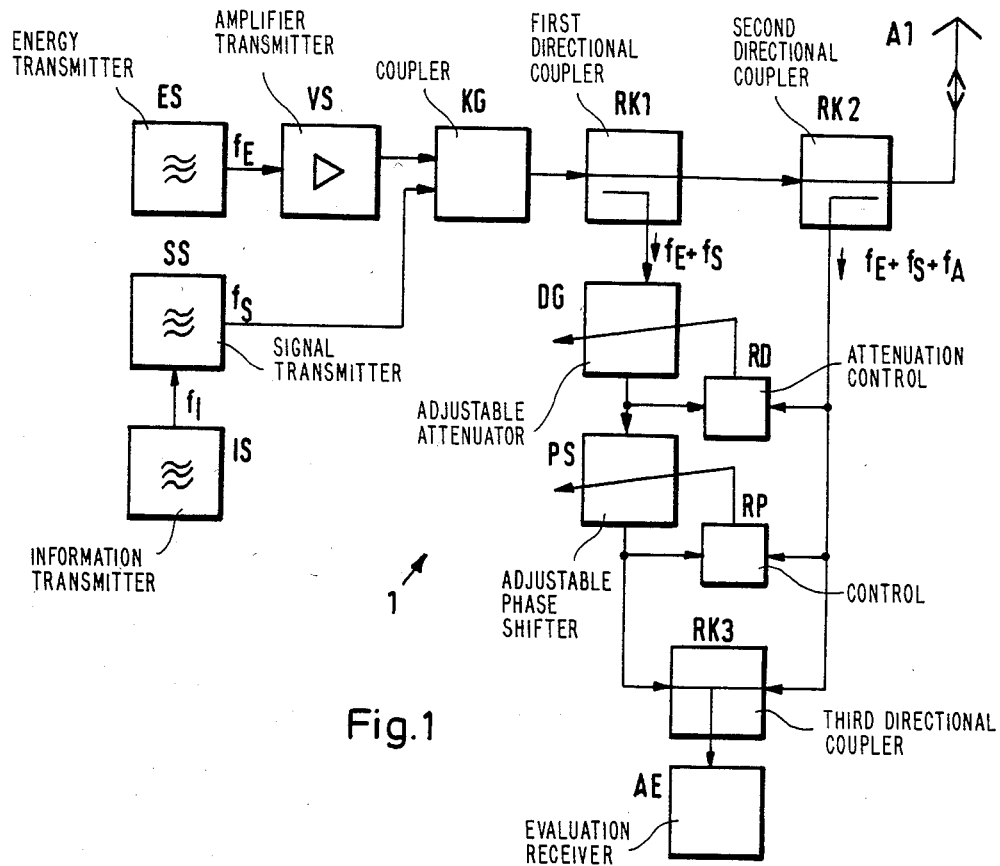

United States Patent [19]

Strietzel

[11] Patent Number: 4,556,883
[45] Date of Patent: Dec. 3, 1985

[54] TRANSMITTING AND RECEIVING CIRCUIT FOR AN APPARATUS FOR THE AUTOMATIC IDENTIFICATION OF OBJECTS AND/OR LIVING ORGANISMS

[75] Inventor: Rainer Strietzel, Heidelberg, Fed. Rep. of Germany

[73] Assignee: Brown, Boveri & Cie AG, Mannheim, Fed. Rep. of Germany

[21] Appl. No.: 451,481

[22] Filed: Dec. 20, 1982

[30] Foreign Application Priority Data

Dec. 21, 1981 [DE] Fed. Rep. of Germany ....... 3150704

[51] Int. Cl.[4] ..................... H04Q 9/00; G01S 13/78; H04B 1/59
[52] U.S. Cl. .................................. 340/825.54; 367/2; 343/6.5 R
[58] Field of Search ............ 343/6.5 R, 6.8 R, 6.5 SS, 343/17.7; 340/870.16, 825.54; 367/2

[56] References Cited

U.S. PATENT DOCUMENTS

| | | | |
|---|---|---|---|
| 2,505,525 | 4/1950 | Clapp et al. | 343/17.7 |
| 3,149,284 | 9/1964 | Kishinsky | 343/17.7 X |
| 3,185,985 | 5/1965 | Child et al. | 343/17.7 |
| 3,213,446 | 10/1965 | Voyner | 343/6.5 R |
| 3,214,758 | 10/1965 | Mills et al. | 343/17.7 |
| 3,229,289 | 1/1966 | Stine | 343/17.7 |
| 3,308,460 | 3/1967 | O'Brien | 343/17.7 |
| 3,452,354 | 6/1969 | Neuendorf | 343/17.7 |
| 3,518,675 | 6/1970 | Skorheim | 343/17.7 X |
| 3,859,624 | 1/1975 | Kriofsh et al. | 343/6.5 SS X |
| 4,005,425 | 1/1977 | Nagy | 343/17.7 |
| 4,138,645 | 2/1979 | Parato | 343/17.7 X |
| 4,333,072 | 6/1982 | Beigel | 343/6.5 SS X |
| 4,418,411 | 11/1983 | Strietzel | 340/870.16 X |
| 4,443,430 | 4/1984 | Schneider | 343/6.5 R |
| 4,467,326 | 8/1984 | Charas et al. | 343/6.5 R |
| 4,514,731 | 4/1985 | Falck et al. | 340/825.54 X |

FOREIGN PATENT DOCUMENTS 2524571 12/1977 Fed. Rep. of Germany .

OTHER PUBLICATIONS

German Published Non-Prosecuted Application DE-OS 2919753, 11/27/80.
H. Groll: "Mikrowellen Messtechnik", (Microwave Measurement Technology), Friedrich Viebig & Sohn publishers, Brunswick, 1969, p. 217, FIG. 6.7.

Primary Examiner—Charles T. Jordan
Assistant Examiner—Brian S. Steinberger
Attorney, Agent, or Firm—Herbert L. Lerner; Adam A. Jorgensen

[57] ABSTRACT

Transmitting and receiving circuit for an apparatus for the automatic identification of objects and/or living organisms, including a stationary interrogator and a transponder fastened to the object or living organism to be identified, the interrogator including an energy transmitter, a signal transmitter, a first directional coupler connected to the energy and signal transmitters for receiving outgoing waves from the transmitters and for decoupling a first energy component from the outgoing waves, a first transmitting and receiving antenna, a second directional coupler being connected in series with the first directional coupler and being connected to the first transmitting and receiving antenna for receiving returning waves from the transponder and for decoupling a second energy component from the returning waves, an adjustable attenuator connected to the first directional decoupler for receiving the first energy component, an adjustable phase shifter connected to the adjustable attenuator for receiving the first energy component, a third directional coupler having a first input connected to the adjustable phase shifter for receiving the first energy component, a second input connected to the second directional coupler for directly receiving the second energy component, and an output, the attenuator and the phase shifter being adjusted for providing a signal at the output of the third directional coupler with a minimum, and an evaluation unit connected to the output of the third directional coupler, and the transponder including an energy receiver, an energy converter connected to the energy receiver, a signal receiver, a signal demodulator connected to the signal receiver, a data processing unit connected to the signal demodulator, a reply transmitter connected to the data processing unit, and a second transmitting and receiving antenna connected to the energy receiver, signal receiver and reply transmitter.

8 Claims, 2 Drawing Figures

TRANSMITTING AND RECEIVING CIRCUIT FOR AN APPARATUS FOR THE AUTOMATIC IDENTIFICATION OF OBJECTS AND/OR LIVING ORGANISMS

The invention relates to a transmitting and receiving circuit for a device for the automatic identification of objects and/or living organisms, having a stationary interrogator and a transponder fastened to the object or the living organism, in which the interrogator contains an ernergy transmitter, a signal transmitter, an evaluation unit and a transmitting/receiving antenna, and the transponder contains an energry receiver with an energy converter, a signal receiver with a signal demodulator, a data processing unit, a reply transmitter and a transmitting/receiving antenna.

Such apparatus for the automatic identification of objects and/or living organisms is known from German Published, Non-Prosecuted Application DE-OS No. 29 19 753. Besides the high-frequency transmitting and receiving units, the prior art interrogator contains an opening code memory and, optionally, a supplementary opening code memory which store an opening code that serves for activating a transponder or a group of transponders which are specifically programmed for this opening code. For this purpose, the transponder contains a signal receiver followed by an opening code comparator which compares the code stored in the opening code memory and, optionally, the supplementary opening code memory with the code received over the radio path. The output signal of the opening code comparator controls the reply transmitter through opening code processor. In addition, the interrogator and the transponder may have further data-processing units, corresponding to the desired application.

From German Published, Non-Prosecuted Application DE-OS No. 25 24 571, a homodyne transmission system for radio location is known. A system referred to as a homodyne system is a system in which a sample of the transmitted signal is used as the local oscillator signal. The high-frequency signal is emitted by an interrogator unit and intercepted by a compatible acknowledgement unit. The acknowledgement unit furnishes a signal which is reflected or sent back to the interrogator unit. A sample of the emitted signal is fed, together with the reply signal, to a suitable phase detector or a mixing stage. The amplitude or the mixing stage output signal is equal to the product obtained from the amplitude of the sample of the emitted signal and the amplitude of the reply signal, as well as the cosine of the relative phase angle. Since the interrogation and the reply signal are furnished by the same source, the relative phase of these signals, or the phase difference between the signals, is a function of the distance between the interrogation and the acknowledgement units. If the sample of the interrogation signal and the reply signal are phase-shifted 90°, however, the output signal of the mixing stage has a zero amplitude. Eliminating such amplitude zeroes and the possible errors resulting therefrom in the processing and recovery of the information over the distance between the interrogation unit and the acknowledgement unit, is the object of this invention.

In the book by H. Groll:"Mikrowellen Messtechnik" (Microwave Measurement Technology), Friedrich Viebig & Sohn publishers, Brunswick 1969, on page 217 and in FIG. 6.70, a microwave measuring device for determining the impedance of the measuring object by means of two directional couplers is described. A component of the wave travelling from the measuring transmitter to the measuring object is decoupled by a first directional coupler and fed through an adjustable attenuator and an adjustable phase shifter to one input of a T junction. The wave reflected by the measuring object is fed through a second directional coupler to the second input of the T junction. By simultaneous adjustment of the attenuator and the phase shifter, a condition can be achieved in which the two waves have the same amplitude and a 180° phase shift at the T junction. Then, a null reading is obtained at the diode at the output of the T junction, and the magnitude of the reflection coefficient can be read at the attenuator, provided that the two directional couplers have the same attenuation. For measuring the phase of the reflection coefficient, a reference phase must be adjusted by a short-circuit test. The phase of the measuring object is then obtained from the difference of the two settings of the phase shifter.

It is accordingly an object of the invention to provide a transmitting and receiving circuit for an apparatus for the automatic identification of objects and/or living organisms, which overcomes the hereinafore-mentioned disadvantages of the heretofore-known devices of this general type, and which makes it possible to filter the reply frequency and the information transmitted thereby from the signal mixture present at the antenna of the interrogator, using only one antenna for transmitting and receiving the energy frequency, the signal frequency and the reply frequency.

With the foregoing and other objects in view there is provided, in accordance with the invention, a transmitting and receiving circuit for an apparatus for the automatic identification of objects and/or living organisms, including a stationary interrogator and a transponder fastened to the object or living organism to be identified, the interrogator including an energy transmitter, a signal transmitter, a first directional coupler connected to the energy and signal transmitters for receiving outgoing waves from the transmitters and for decoupling a first energy component from the outgoing waves, a first transmitting and receiving antenna, a second directional coupler being connected in series with the first directional coupler and being connected to the first transmitting and receiving antenna for receiving returning waves from the transponder and for decoupling a second energy component from the returning waves, an adjustable attenuator connected to the first directional decoupler for receiving the first energy component, an adjustable phase shifter connected to the adjustable attenuator for receiving the first energy component, a third directional coupler having a first input connected to the adjustable phase shifter for receiving the first energy component, a second input connected to the second directional coupler for directly receiving the second energy component, and an output, the attenuator and the phase shifter being adjusted for providing a signal at the output of the third directional coupler with a minimum, and an evaluation unit connected to the output of the third directional coupler, and the transponder including an energy receiver, an energy converter connected to the energy receiver, a signal receiver, a signal demodulator connected to the signal receiver, a data processing unit connected to the signal demodulator, a reply transmitter connected to the data processing unit, and a second transmitting and receiving antenna connected to the energy receiver, signal receiver and reply transmitter.

The invention makes use of the fact, which is known per se, that two waves stemming from the same source can be cancelled by shifting the phase, attenuating the amplitude and superposition. The special feature of the present invention is, however, that the energy frequency and the signal frequency do not agree; that the impedance of the space covered by the radiation field of the antenna of the interrogator is not definable; and that contrary to the above-described microwave impedance measuring method, it is not possible to calibrate the phase shifter and the attenuator by a short circuit test. A further difficulty is that the energy frequency is emitted, for instance, with a power of several watts since it must ensure the voltage supply of the transponder; that due to government regulations, the signal frequency cannot be radiated with more than 0.5 W and that the reply frequency is received in the power range of nanowatts. In spite of these unfavorable assumptions, it is possible, with the transmitting and receiving circuit according to the invention, to filter the information radiated by the reply transmitter of the transponder from the signal mixture at the transmitting/receiving antenna of the interrogator.

In accordance with another feature of the invention, there is a first control device connected to the attenuator and a second control device connected to the phase shifter, the control devices continuously compensating changes in amplitude and phase between the outgoing and returning waves. This prevents the changes of the reflection conditions of the space covered by the antenna of the interrogator, which always occur in the practical application of the device for the automatic identification of objects and/or living organisms, from leading to a change of the compensation point such that the signal stemming from the reply signal transmitter could no longer be detected. In the known applications for measuring the impedance, such problems cannot arise since there, the microwaves do not leave the measuring circuit.

In accordance with a further feature of the invention the energy transmitter transmits an unmodulated signal with relatively high power at an energy frequency, and the signal transmitter transmits a signal modulated with an information signal with considerably lower power (a power ratio of approximately 100:1) at a signal frequency adjacent the energy frequency. In this way, on one hand it is possible to irradiate the transponder by radio with the necessary high-frequency power which is required for generating a sufficient d-c supply voltage, while on the other hand complying with the government regulations which allow the emission of modulated high-frequency energy in installations of the type to which the invention relates, with only a maximum power of 0.5 W.

In accordance with a concomitant feature of the invention the reply transmitter radiates a reply signal with the energy frequency. In this manner, it is possible to use part of the energy signal received by the transponder as a carrier for the transponder, and to avoid the use of a separate local transmitter in the transponder which draws a great deal of power.

Other features which are considered as characteristic for the invention are set forth in the appended claims.

Although the invention is illustrated and described herein as embodied in a transmitting and receiving circuit for an apparatus for the automatic identification of objects and/or living organisms, it is nevertheless not intended to be limited to the details shown, since various modifications and structural changes may be made therein without departing from the spirit of the invention and within the scope and range of equivalents of the claims.

Figure 2:
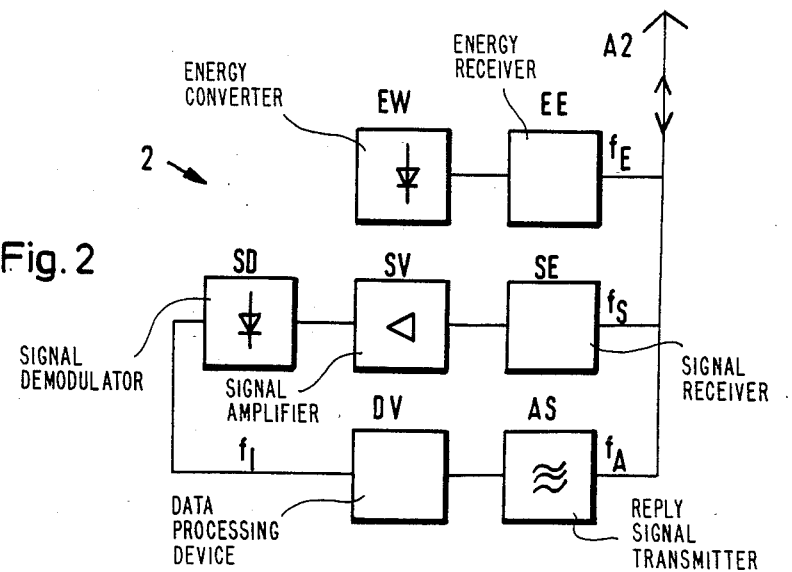

The construction and method of operation of the invention, however, together with additional objects and advantages thereof will be best understood from the following description of specific embodiments when read in connection with the accompanying drawings, in which:

FIG. 1 is a schematic block circuit diagram of an interrogator on the high frequency side; and FIG. 2 is a block circuit diagram of a transponder.

Referring now to the figures of the drawing and first particularly to FIG. 1 thereof, there is seen an interrogator 1 with an energy transmitter ES which furnishes a high or very high-frequency wave with an energy frequency $f_E$ that passes through a transmitter amplifier VS to a first input of a coupler KG. There is further seen a signal transmitter SS which furnishes a high or very high-frequency wave with a signal frequency $f_S$ to a second input of the coupler KG. The signal frequency wave is modulated with an information frequency $f_I$ which is provided by an information transmitter IS. The construction and operation of the information transmitter IS can be seen from German Published, Non-Prosecuted Application DE-OS No. 29 19 753 already mentioned hereinafore.

The sum of the energy wave and the signal wave travels from the output of the coupler KG as an outgoing wave, though a first directional coupler RK1 and a second directional coupler RK2, to a transmitting and receiving Antenna A1, through which it is radiated.

The high or very high-frequency energy received by the transmitting and receiving antenna A1 travels as a returning wave to the second directional coupler RK2, is decoupled at that location, and flows directly to a first input of a third directional coupler RK3.

Part of the outgoing wave decoupled from the first directional coupler RK1 is fed to a second input of the third directional coupler RK3. The wave trains are superimposed in the third directional coupler RK3 and the result of this superposition is fed to an evaluation receiver AE.

In order to permit the best cancellation or compensation in the third directional coupler RK3, that part of the outgoing wave which is decoupled at the first directional coupler RK1 and contains the energy frequency $f_E$ as well as the signal frequency $f_S$, is brought through an adjustable attenuator DG and an adjustable phase shifter PS. The attenuator DG is controlled by an attenuation control RD in such a way that the amplitudes of the signals present at the two inputs of the control are equal. The phase shifter PS is controlled in such a way that the phases of the signals present at the two inputs of a control RP are phase-shifted 180°. Besides the energy frequency $f_E$, the returning wave also contains a reply frequency $f_A$ of a reply transmitter AS from a responder 2, to be discussed below. In this manner, it is possible to filter the components of the energy frequency $f_E$ and the signal frequency $f_S$ in the returning wave by cancellation or compensation in such a way that only the components with the reply frequency $f_A$ are still fed to the input of the evaluation receiver AE.

In FIG. 2 it is seen that the transponder 2, which may be connected to a non-illustrated object and/or living organism to be identified, contain a transmitting and receiving antenna A2, to which an energy receiver EE is connected. The energy receiver EE filters out the energy frequency $f_E$ and feeds it to an energy converter EW which generates the d-c supply voltage for the transponder 2 from the energy frequence. Further connected to the antenna A2 is a signal receiver SE which filters out the signal frequency $f_S$ and feeds it through a signal amplifier SV to a signal demodulator SD. In the signal demodulator, information frequency $f_I$ is recovered and is fed to a data processing device DV. The construction and operation of the data processing unit can again be seen from the hereinafore-mentioned German Published, Non-Prosecuted Application DE-OS No. 29 19 753.

The output signal of the data processing unit DV modulates the reply signal transmitter AS which delivers the reply frequency $F_A$ to the antenna A2, from where it is reradiated to the interrogator 1. It is possible in this case, as already mentioned, for the reply frequency $f_A$ to be equal to the energy freqency $f_E$.

The foregoing is a description corresponding to German Application No. P 31 50 704.2, dated Dec. 21, 1981, the International priority of which is being claimed for the instant application, and which is hereby made part of this application. Any discrepancies between the foregoing specification and the aforementioned corresponding German application are to be resolved in favor of the latter.

I claim:

1. Transmitting and receiving circuit for an apparatus for the automatic identification of objects and/or living organisms, comprising a stationary interrogator and a transponder fastened to the object or living organism to be identified, said interrogator including an energy transmitter, a signal transmitter, a first directional coupler connected to said energy and signal transmitters for receiving outgoing waves from said transmitters and for decoupling a first energy component from said outgoing waves, a first transmitting and receiving antenna, a second directional coupler being connected in series with said first directional coupler and being connected to said first transmitting and receiving antenna for receiving returning waves from said transponder and for decoupling a second energy component from said returning waves, an adjustable attenuator connected to said first directional decoupler for receiving said first energy component, an adjustable phase shifter connected to said adjustable attenuator for receiving said first energy component, a third directional coupler having a first input connected to said adjustable phase shifter for receiving said first energy component, a second input connected to said second directional coupler for directly receiving said second energy component, and an output, said attenuator and said phase shifter being adjusted for providing a signal at said output of said third directional coupler with a minimum, and an evaluation unit connected to said output of said third directional coupler, and said transponder including an energy receiver, an energy converter connected to said energy receiver, a signal receiver, a signal demodulator connected to said signal receiver, a data processing unit connected to said signal demodulator, a reply transmitter connected to said data processing unit, and a second transmitting and receiving antenna connected to said energy receiver, signal receiver and reply transmitter.

2. Circuit according to claim 1, including a first control device connected to said attenuator and a second control device connected to said phase shifter, said control devices continuously compensating changes in amplitude and phase between said outgoing and returning waves.

3. Circuit according to claim 1, wherein said energy transmitter transmits an unmodulated signal with relatively high power at an energy frequency, and said signal transmitter transmits a signal modulated with an information signal with relatively lower power at a signal frequency adjacent said energy frequency.

4. Circuit according to claim 2, wherein said energy transmitter transmits an unmodulated signal with relatively high power at an energy frequency, and said signal transmitter transmits a signal modulated with an information signal with relatively lower power at a signal frequency adjacent said energy frequency.

5. Circuit according to claim 1, wherein said reply transmitter radiates a reply signal with an energy frequency.

6. Circuit according to claim 2, wherein said reply trasmitter radiates a reply signal with an energy frequency.

7. Circuit according to claim 3, wherein said reply transmitter radiates a reply signal with the energy frequency.

8. Circuit according to claim 4, wherein said reply transmitter radiates a reply signal with the energy frequency.

* * * * *